(12) United States Patent
Sabio et al.

(10) Patent No.: US 9,776,919 B2
(45) Date of Patent: Oct. 3, 2017

(54) RAPID HYDRAULIC BINDER COMPRISING A CALCIUM SALT

(71) Applicant: LAFARGE, Paris (FR)

(72) Inventors: Serge Sabio, Saint Quentin Fallavier (FR); Serge Ghilardi, Saint Quentin Fallavier (FR); Xiaolin Pardal, Saint Quentin Fallavier (FR); Michel Testud, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 78 days.

(21) Appl. No.: 14/402,871

(22) PCT Filed: May 21, 2013

(86) PCT No.: PCT/EP2013/060357
§ 371 (c)(1),
(2) Date: Nov. 21, 2014

(87) PCT Pub. No.: WO2013/174784
PCT Pub. Date: Nov. 28, 2013

(65) Prior Publication Data
US 2015/0107492 A1 Apr. 23, 2015

(30) Foreign Application Priority Data

May 22, 2012 (FR) ...................... 12 54628

(51) Int. Cl.
*C04B 7/02* (2006.01)
*C04B 28/04* (2006.01)
*C04B 28/14* (2006.01)
*C04B 111/76* (2006.01)

(52) U.S. Cl.
CPC ............ *C04B 7/02* (2013.01); *C04B 28/04* (2013.01); *C04B 28/14* (2013.01); *C04B 2111/766* (2013.01); *Y02W 30/92* (2015.05); *Y02W 30/94* (2015.05)

(58) Field of Classification Search
CPC .................................. C04B 28/04; C04B 7/02
See application file for complete search history.

(56) References Cited

U.S. PATENT DOCUMENTS 4,092,109 A * 5/1978 Rosenberg .............. C04B 28/02
106/14.05

FOREIGN PATENT DOCUMENTS

| EP | 1 731 491 A1 | 12/2006 |
|----|---|---|
| FR | 2 943 662 A1 | 10/2010 |
| WO | 2006/032785 A2 | 3/2006 |
| WO | 2006/032786 A2 | 3/2006 |
| WO | 2006/131659 A2 | 12/2006 |

OTHER PUBLICATIONS

International Preliminary Report on Patentability issued in International Patent Application No. PCT/EP2013/060357, dated Dec. 4, 2014.
International Search Report issued in International Patent Application No. PCT/EP2013/060357, dated Sep. 5, 2013.
Justnes, "Calcium Nitrate as a Multifunctional Concrete Admixture," SINTEF Technology and Society, Concrete, Jan. 1, 2006 (Jan. 1, 2006), pp. 1-8.
Susilorini, "'Green' Admixtures for Sustainable Concrete Implemented to Subsidized Apartment," Seminar Nasional 2009—Jurusan Teknik Sipil, FT-UKM, Aug. 15, 2009, pp. 1-9.

* cited by examiner

*Primary Examiner* — Paul Marcantoni
(74) *Attorney, Agent, or Firm* — Pillsbury Winthrop Shaw Pittman LLP

(57) ABSTRACT

A hydraulic binder includes a Portland clinker having a Blaine specific surface of 4000 to 5500 cm²/g, from 2.5 to 8% of sulphate expressed by mass of $SO_3$ relative to the mass of clinker, from 1.5 to 10% of calcium nitrite and/or calcium nitrate expressed as anhydrous mass relative to the mass of clinker and from 15 to 50% of a mineral addition including calcium carbonate by mass relative to the total mass of binder.

12 Claims, No Drawings

RAPID HYDRAULIC BINDER COMPRISING A CALCIUM SALT

CROSS-REFERENCE TO RELATED APPLICATIONS

This is the U.S. National Stage of PCT/EP2013/060357, filed May 21, 2013, which in turn claims priority to French Patent Application No. 1254628, filed May 22, 2012, the entire contents of these applications are incorporated herein by reference in their entireties. p The present invention relates to the field of building materials, and more particularly to a rapid hydraulic binder, which is to say, a binder which sets and hardens rapidly.

A current trend in the field of hydraulic binders and hydraulic compositions is to reduce the quantity of clinker. However, this reduction induces problems, in particular in terms of mechanical strengths, and more particularly for the early age strengths (24 hours after mixing) or very early age strengths (for example 4 or 6 hours after mixing).

A known solution to improve the development of very early mechanical strengths consists of activating the formation of hydrates in the hydraulic binders, called CSH.

With this aim, the current process consists of increasing the fineness of the clinker. However, this increase of the fineness of the clinker is limited because it requires an increase of the content of added calcium sulphate above the maximum content specified in the EN 197-1 Standard of February 2001. The maximum value specified in the standard is 4% of $SO_3$ by mass relative to the mass of binding phase, given that the binding phase comprises a clinker, sulphate, and optionally a mineral addition.

On another hand, the development of mechanical strengths, in particular for the very early age strengths, at temperatures below or equal to 20° C. is also a problem. The development of mechanical strengths does indeed vary according to the temperature and it slows down when the temperature decreases.

Several types of accelerators are known, for example calcium salts, but their efficiency decreases when the temperature drops, which makes the development of mechanical strengths difficult and even impossible, depending on the type of cement used, at very early time periods, for example 6 hours after mixing.

Therefore, there is a need for a hydraulic binder, capable of developing suitable strengths for the very early ages, and in particular 4 and 6 hours after mixing, whatever the temperature and in particular at a temperature below or equal to 20° C., for example at approximately 10° C.

Therefore, the problem that the invention intends to solve is to provide a hydraulic binder comprising a clinker, having, in the presence of calcium nitrite and/or calcium nitrate, a greater development of mechanical strengths for the very early ages (for example 4 or 6 hours after mixing) than those of a corresponding pure cement or a blended cement for the same or less quantity of clinker.

The aim of the present invention is to obtain sufficient mechanical strengths with a hydraulic binder comprising the lowest possible quantity of clinker for the very early ages, which is to say, at time periods less than or equal to 24 hours after mixing, and in particular 4 hours or 6 hours after mixing. The mechanical strengths are generally considered to be sufficient when they allow formwork removal and/or handling of objects cast for the construction field obtained from the hydraulic composition according to the present invention. For example, mechanical strengths may be considered to be sufficient when they are greater than or equal to 1 MPa 4 hours after mixing, preferably greater than or equal to 3 MPa 6 hours after mixing, more preferably greater than or equal to 5 MPa 6 hours after mixing.

The solution according to the present invention is to combine a given quantity of sulphate, a given quantity of calcium nitrite and/or calcium nitrate, a given fineness of the clinker and a given quantity of a mineral addition comprising calcium carbonate and optionally another mineral addition.

The present invention seeks to provide new hydraulic binders and hydraulic compositions which have one or more of the following characteristics:

- A hydraulic binder according to the present invention may be used at low temperature, which is to say, generally at a temperature below or equal to 20° C., preferably less than or equal to 15° C., more preferably less than or equal to 10° C.;
- A hydraulic binder according to the present invention may have a substantially identical slump retention to that of a corresponding pure cement or blended cement, for a same or lesser quantity of clinker. Slump retention is determined experimentally (as described in greater detail in the examples) by repeated spread measurements at different time periods.
- A hydraulic binder according to the present invention may have a compressive strength equivalent to that of a standardised 32.5 R cement, even to a standardised 42.5 R cement (refer to the NF EN 197-1 Standard of February 2001, paragraph 7, table 2).

The present invention relates to a hydraulic binder comprising a Portland cement clinker having a Blaine specific surface area of 4000 to 5500 cm2/g, from 2.5 to 8% of sulphate 30 expressed by mass of $SO_3$ relative to the mass of clinker, from 1.5 to 10% of calcium nitrite and/or calcium nitrate expressed as anhydrous mass relative to the mass of clinker and from 15 to 50% of a mineral addition comprising calcium carbonate by mass relative to the total mass of binder.

A hydraulic binder is a material which sets and hardens by hydration, for example a cement.

The setting phase is generally the passage to the solid state by chemical hydration reaction of a hydraulic binder. The setting phase is generally followed by a hardening phase.

The hardening phase generally corresponds to the development of mechanical properties of a hydraulic binder. The hardening phase generally takes place after the end of the setting phase.

Portland cement clinker is obtained by clinkering at high temperature a mixture comprising limestone and, for example, clay.

Preferably, the quantity of clinker in the hydraulic binder is from 40 to 80%, more preferably from 44 to 75%, most preferably from 46 to 70% by mass relative to the total mass of binder.

Preferably, the quantity of clinker in the hydraulic composition according to the invention described herein below is from 220 to 450 kg/m³, more preferably from 220 to 420 kg/m³.

Preferably, the Blaine specific surface area of the clinker is from 4500 to 5000 cm²/g.

Preferably, the quantity of sulphate is from 4 to 6%, the percentage being expressed by mass of $SO_3$ relative to the mass of clinker.

Preferably, the quantity of sulphate is at most 4%, expressed by mass of $SO_3$ relative to the mass of binding phase, the binding phase comprising the clinker, the mineral addition comprising calcium carbonate, the sulphate and optionally a mineral addition other than a mineral addition comprising calcium carbonate.

Preferably, the sulphate is calcium sulphate. Calcium sulphate used according to the present invention includes gypsum (calcium sulphate dihydrate, $CaSO_4.2H_2O$), hemihydrate ($CaSO_4.½H_2O$), anhydrite (anhydrous calcium sulphate, $CaSO_4$) or mixtures thereof. The gypsum and anhydrite exist in the natural state. Calcium sulphate produced as a by-product of certain industrial processes may also be used.

Preferably, the quantity of calcium nitrite and/or calcium nitrate is from 2 to 7%, the percentage being expressed by anhydrous mass relative to the mass of clinker.

Preferably, the calcium salt used according to the present invention is a calcium nitrite.

Without being bound by theory, it is generally believed that when the quantity of sulphate increases, it is preferable to also increase the quantity of calcium nitrite and/or calcium nitrate in order to maintain equivalent mechanical strengths.

Likewise, it is generally believed that when the quantity of calcium nitrite and/or calcium nitrate increases, it is preferable to also increase the quantity of sulphate to maintain equivalent mechanical strengths.

Finally, it is believed that when the fineness of the clinker increases, it is preferable to also increase the quantity of sulphate to maintain equivalent mechanical strengths.

Preferably, the quantity of a mineral addition comprising calcium carbonate is from 20 to 50%, more preferably from 25 to 45% by mass relative to the total mass of binder.

Generally, the mineral addition comprising calcium carbonate has a Blaine specific surface area greater than or less than that of the clinker. Preferably, the mineral addition comprising calcium carbonate has a Blaine specific surface area from 3000 to 5000 $cm^2/g$.

Preferably, the mineral addition comprising the calcium carbonate is limestone.

Preferably, the hydraulic binder according to the present invention comprises a mineral addition other than a mineral addition comprising calcium carbonate.

A mineral addition is generally a finely divided mineral material used in hydraulic compositions (for example concrete) or hydraulic binders (for example cement) in order to improve certain properties or to give it particular properties. Examples of mineral additions are slags (for example, as defined in the European NF EN 197-1 Standard of February 2001, paragraph 5.2.2), pozzolans (for example, as defined in the European NF EN 197-1 Standard of February 2001, paragraph 5.2.3), fly ash (for example, as defined in the European NF EN 197-1 Standard of February 2001, paragraph 5.2.4), calcined shale (for example, as defined in the European NF EN 197-1 Standard of February 2001, paragraph 5.2.5), mineral additions comprising calcium carbonate, for example limestone (for example, as defined in the European NF EN 197-1 Standard of February 2001, paragraph 5.2.6), silica fume (for example, as defined in the European NF EN 197-1 Standard of February 2001, paragraph 5.2.7), metakaolins or mixtures thereof.

Preferably, the mineral addition other than the mineral addition comprising the calcium carbonate used according to the present invention is a pozzolan, a fly ash or mixtures thereof.

It is to be understood that the partial replacement of the clinker by a mineral addition comprising calcium carbonate and optionally another mineral addition makes it possible to reduce emissions of carbon dioxide (produced during the production of the clinker) by decreasing the quantity of clinker, whilst obtaining the same mechanical strengths.

The present invention also relates to a hydraulic composition comprising the binder according to the present invention and water.

A hydraulic composition generally comprises a hydraulic binder and water, optionally aggregates and optionally admixtures.

The hydraulic composition according to the invention includes both fresh and hardened compositions, for example a cement slurry, a mortar or a concrete.

Preferably, the hydraulic composition according to the invention comprises a quantity of binding phase greater than or equal to 300 $kg/m^3$, more preferably greater than or equal to 350 $kg/m^3$, most particularly greater than or equal to 400 $kg/m^3$. A binding phase generally comprises a clinker, a mineral addition comprising calcium carbonate, sulphate and optionally a mineral addition other than the mineral addition comprising calcium carbonate.

Preferably, the hydraulic composition according to the invention comprises a quantity of binding phase less than or equal to 700 $kg/m^3$, more preferably less than or equal to 600 $kg/m^3$.

A cubic meter of concrete is generally the quantity of fresh concrete, which, once compacted according to the method described in the EN 12350-6 Standard, occupies a volume of one cubic meter (refer to the EN 206-1 Standard of October 2005, paragraph 3.1.15). The quantities expressed in $kg/m^3$ relate to this definition of the cubic meter.

The aggregates optionally used in the composition according to the invention include sand (whose particles generally have a maximum size (Dmax) less than or equal to 4 mm), and coarse aggregates (whose particles generally have a minimum size (Dmin) greater than 4 mm and preferably a Dmax less than or equal to 20 mm).

The aggregates include calcareous, siliceous, and silico-calcareous materials. They include natural, artificial, waste and recycled materials. The aggregates may also comprise, for example, wood.

The admixtures optionally used in the composition according to the invention may be, for example one of those described in the EN 934-2, EN 934-3 or EN 934-4 Standards, respectively of September 2002, November 2009 and August 2009.

Preferably, the hydraulic compositions also comprise an admixture for a hydraulic composition, for example, an accelerator, an air-entraining agent, a viscosity-modifying agent, a retarder, a clay-inerting agent, a plasticizer and/or a superplasticizer. In particular, it is useful to include a superplasticizer, for example a polycarboxylate superplasticizer, in particular from 0.05 to 1.5%, preferably from 0.1 to 0.8% by mass.

Clay-inerting agents are compounds which permit the reduction or prevention of the harmful effects of clays on the properties of hydraulic binders. Clay-inerting agents include those described in the patent applications WO 2006/032785 and WO 2006/032786.

The term superplasticizer as used in the present description and the accompanying claims is to be understood as including both water reducers and superplasticizers as described in the Concrete Admixtures Handbook, Properties Science and Technology, V. S. Ramachandran, Noyes Publications, 1984.

A water reducer is defined as an admixture which reduces the amount of mixing water of concrete for a given workability by typically 10-15%. Water reducers include, for example lignosulphonates, hydroxycarboxylic acids, glucides and other specialized organic compounds, for example glycerol, polyvinyl alcohol, sodium alumino-methyl-siliconate, sulfanilic acid and casein.

Superplasticizers belong to a new class of water reducers, chemically different from the older water reducers and capable of reducing water contents by about 30%. The superplasticizers have been broadly classified into four groups: sulphonated naphthalene formaldehyde condensate (SNF) (generally a sodium salt); sulphonated melamine formaldehyde condensate (SMF); modified lignosulfonates (MLS); and others. More recent superplasticizers include polycarboxylic compounds such as polycarboxylates, e.g. polyacrylates. A superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used. Phosphonic acid derivatives may also be used. The amount of superplasticizer required generally depends on the reactivity of the cement. The lower the reactivity, the lower the amount of superplasticizer required. In order to reduce the total alkali salt content the superplasticizer may be used as a calcium salt rather than a sodium salt.

The hydraulic composition according to the invention may be used directly on the jobsite in the fresh state and poured into a formwork adapted to a given application, used in a pre-cast plant or used as a coating on a solid support.

The mixing of the hydraulic composition may be carried out, for example by known methods.

Preferably, the hydraulic composition according to the present invention has a workability period of approximately 2 hours. The workability period is to be understood as the period during which fluidity is maintained. Monitoring of the spread evolution over time makes it possible to monitor the workability (as explained in more detail in the examples).

Slump retention and the development of early mechanical strengths, for example 4 hours or 6 hours after mixing, make it possible to first produce a hydraulic composition at a concrete batching plant, then transport it to a jobsite in a mixer truck, the composition hardening rapidly once it is poured.

Slump retention and the development of early mechanical strengths can also allow the hydraulic binder to be mechanically pumped due to its fluidity, and to be poured into formwork where it will rapidly harden.

According to an embodiment of the invention, the hydraulic binder is prepared during a first step, and the aggregates and water are added during a second step.

The hydraulic composition according to the present invention may be shaped to produce, after hydration and hardening, a shaped article for the construction field. Such shaped articles that comprise the hydraulic binder according to the present invention or the hydraulic composition according to the present invention also constitute a feature of the invention. Shaped articles for the construction field include, for example, a floor, a screed, a foundation, a wall, a partition wall, a ceiling, a beam, a work top, a pillar, a bridge pier, a block of concrete, optionally foamed concrete, a pipe, a post, a stair, a panel, a cornice, a mould, a road system component (for example a border of a pavement), a roof tile, a surfacing (for example of a road or a wall), an insulating component (acoustic and/or thermal).

The use of a hydraulic composition according to the present invention can make it possible to optimize the efficiency of the calcium nitrite and/or calcium nitrate and thus increase the mechanical strengths for a time period under or equal to 6 hours after mixing.

There may be certain advantages in increasing the mechanical strengths for a time period under or equal to 6 hours after mixing. It may indeed be possible to increase the re-usage rate of formworks. A compressive strength of at least 1 MPa 4 hours after mixing makes it possible to remove formwork at this very short time period and be able to use the formworks a second time during the same work day;

The development of a compressive strength of 3 to 5 MPa 6 hours after mixing makes it possible to handle and lift pre-cast objects on the jobsite at this very short time period.

The present invention also relates to a process for production of a hydraulic composition according to the present invention, wherein the temperature at the time of mixing of the various components with water and the temperature at the time of the setting of the composition is from 5 to 35° C., more preferably from 5 to 20° C., even more preferably from 5 to 15° C., most particularly from 5 to 10° C.

In the present description, including the accompanying claims, unless otherwise specified, the percentages are expressed by mass.

The Blaine specific surface areas are determined by known methods.

EXAMPLES

Raw Materials

The clinker used in the examples came from the Lafarge cement plant of Le Havre (France). The composition of the clinker is given in the table below:

|  | $SiO_2$ | $Al_2O_3$ | $Fe_2O_3$ | CaO | MgO | $K_2O$ | $Na_2O$ | $SO_3$ | $P_2O_5$ |
|---|---|---|---|---|---|---|---|---|---|
| Mass % | 20.98 | 5.85 | 2.5 | 64.7 | 1.1 | 0.31 | 0.14 | 1.16 | 0.7 |

The mineral addition comprising calcium carbonate was limestone commercialised under the brand name of BL200 (supplier: Omya).

Aggregates: each aggregate is characterised by two numbers: the first corresponds to <<d>> as defined in the XPP 18-545 Standard of February 2004 and the second corresponds to <<D>> as defined in the XPP 18-545 Standard of February 2004:

the sand was a 0/4 rolled silica-calcareous sand from the Lafarge quarry of Mauzac;

the coarse aggregates were the 4/14 rolled alluvial silica-calcareous aggregates from the Lafarge quarry of Mauzac.

The superplasticizers were the following products:

SP1: polycarboxylate superplasticizer in solution having 20% of dry extract (supplier: BASF; commercial brand name: Glenium 27); and SP2: superplasticizer (supplier: BASF; commercial brand name: Rheotec).

The calcium nitrite was a calcium nitrite in liquid form having a density of 1.25 +/−0.01 and a dry extract of 32% +/−2% (supplier: Chryso; commercial brand name: SET02).

The sulphate was the anhydrite from eastern France.

Measurement of the Spread and Rheoloqy Monitoring

The spread of the concretes and mortars was measured at 20° C. using an Abrams mini-cone with a volume of 800 mL. The cone dimensions were as follows:

Top diameter: 50+/−0.5 mm;
Bottom diameter: 100+/−0.5 mm; and
Height: 150+/−0.5 mm.

The cone was placed on a dried glass plate and filled with fresh concrete or mortar. It was then leveled. The concrete or mortar slumped onto the glass plate when the cone was removed. The diameter of the disk of concrete or mortar obtained was measured in millimeters +/−5 mm. This is the spread of the concrete or mortar.

These operations were repeated at several time periods (for example at 5, 15 and 30 minutes), and made it possible to monitor the evolution of the rheology for the concrete or the mortar over a given period of time (for example 30 minutes).

Measurement of the Compressive Strength

The measurements of the mechanical compressive strengths were done on samples of hardened concrete or mortar with the following dimensions: 40 mm×40 mm×160 mm.

The samples of concrete or mortar were immediately moulded after the preparation of the concrete or mortar. The mould was attached to a shock table. The concrete or mortar was introduced into the mould in two layers (each layer of concrete or mortar weighing approximately 300 g). The first layer of concrete or mortar, then the second layer was placed by 60 shocks on the shock table. The mould was removed from the shock table and levelled to remove excess concrete or mortar. A plate of glass of 210 mm×185 mm and 6 mm thickness was placed on the mould. The mould covered by the glass plate was placed in a humid enclosure at 10° C. (for Example 1) or at 20° C. (for Example 2). The mould was removed from the enclosure and the sample of hardened concrete or mortar was demoulded at the time period selected for the mechanical compressive test, up to 24 hours after the mixing, then it was submerged in water at 20° C.±1° C.

For the time periods longer than 24 hours after the mixing, the samples were demoulded 24 hours after the mixing, then immersed in water at 20° C.±1° C. (for Example 2). The samples of hardened concrete or mortar were removed from the water 15 minutes maximum, before the measurement of the mechanical compressive strength. The samples of hardened concrete or mortar were dried, then covered with a damp cloth whilst waiting for the measurement An increasing load was applied on the lateral sides of the samples of hardened mortar at a speed of 2 400 N/s±200 N/s for the measurement of the mechanical compressive strength, until breaking of the sample.

The quantity of carbon dioxide emitted during the production of the clinker was theoretically determined.

Example 1

Spread, Compressive Strength and Emitted Carbon Dioxide

The hydraulic compositions according to the invention (Compositions 1 to 4) were compared to a control composition (Control). Table 1 herein below describes the tested compositions, given that each composition further comprised:

172 kg/m$^3$ of water;
0.20% of SP2 by percentage of dry mass relative to the clinker; and
3% by mass of $SO_3$ (provided by the anhydrite) relative to the binding phase (clinker+limestone+anhydrite).

The clinker of the control composition had a Blaine specific surface area of 3500 cm2/g. The clinker of the compositions according to the present invention had a Blaine specific surface area of 4500 cm$^2$/g.

The unit in Table 1 unless otherwise specified is kg/m$^3$.

TABLE 1

Compositions of the concretes tested for Example 1

| | Binding phase | Clinker | Limestone | Anhydrite | Sand | Coarse aggregates | SP1 | $SO_3$/Clinker (mass %) | $Ca(NO_2)_2$/Clinker (mass %) |
|---|---|---|---|---|---|---|---|---|---|
| Control | 400 | 329 | 50 | 21 | 780 | 1108 | 0.36 | 3.5 | 5.3 |
| Comp. 1 | 400 | 251 | 120 | 29 | 780 | 1108 | 0.23 | 4.2 | 7.0 |
| Comp. 2 | 450 | 283 | 135 | 32 | 761 | 1091 | 0.23 | 4.2 | 6.2 |
| Comp. 3 | 500 | 314 | 150 | 36 | 739 | 1066 | 0.23 | 4.2 | 5.6 |
| Comp. 4 | 600 | 377 | 180 | 43 | 670 | 1040 | 0.23 | 4.2 | 4.7 |

The formulae were defined for 1 cubic meter of concrete.

The concrete was produced according to the procedure described herein below:

1) introduction of the sand and coarse aggregates in the vessel of a Perrier mixer;

2) from 0 to 30 seconds: begin mixing at low speed (140 rpm) and add the pre-wetting water in 30 seconds;

3) from 30 seconds to 1 minute, mix the aggregates and the pre-wetting;

4) from 1 minute to 5 minutes, leave to rest;

5) from 5 minutes to 6 minutes, add the clinker, the limestone and anhydrite;

6) from 6 minutes to 7 minutes, mix at low speed;

7) from 7 minutes to 7 minutes and 30 seconds, add the mixing water, SP1 and nitrite whilst mixing at low speed;

8) from 7 minutes and 30 seconds to 9 minutes and 30 seconds, mix at high speed (280 rpm).

The spread and the compressive strength were measured according to the procedures described herein above. Table 2 below gives the obtained results.

TABLE 2

Results for the spread, compressive strength and emitted $CO_2$ measurements for compositions of Example 1

| | Emitted $CO_2$ (kg/m³ of concrete) | Spread (mm) | | | | | | Compressive strengths (MPa) | | |
|---|---|---|---|---|---|---|---|---|---|---|
| | | 5 min | 15 min | 30 min | 60 min | 90 min | 120 min | 4 h | 5 h | 6 h |
| Control | 265 | 285 | 335 | 335 | 300 | 260 | 205 | 0.4 | 1.2 | 2.3 |
| Comp. 1 | 230 | 285 | 305 | 285 | 265 | 235 | 280 | 1.3 | 2.1 | 3.0 |
| Comp. 2 | 260 | 310 | 320 | 320 | 300 | 310 | 335 | 1.6 | 3.0 | 6.2 |
| Comp. 3 | 290 | 240 | 295 | 310 | 300 | 340 | 320 | 2.5 | 5.1 | 7.2 |
| Comp. 4 | 345 | 205 | 245 | 260 | 265 | 270 | 290 | 5.7 | 9.8 | 13.0 |

According to Table 2 above, when the Control composition and Composition 1 are compared, for a same quantity of binding phase (400 kg/m³) but a less quantity of clinker in Composition 1 (respectively 350 kg/m³ of clinker in the Control composition and 280 kg/m³ of clinker in Composition 1), better compressive strengths were obtained. Likewise, the quantity of emitted $CO_2$ decreased, and the spread remained within the same order of magnitude.

When the Control composition and Composition 3 are compared, for a same quantity of clinker (350 kg/m³), better compressive strengths were obtained.

Generally, all the compositions according to the invention made it possible to obtain a compressive strength greater than or equal to 1 MPa 4 hours after the mixing and greater than or equal to 3 MPa 6 hours after the mixing.

It should be noted that the results above were obtained at 10° C. The compositions according to the present invention therefore made it possible to obtain a hydraulic binder having good early mechanical strengths, even at a temperature as low as 10° C.

Example 2

Standardisation

Before being launched on the market, all new hydraulic compositions may be classified in terms of standards, for example according to the EN 197-1 Standard of February 2001. With this aim, the compressive strength of the hydraulic composition is determined according to the EN196-1 Standard of April 2006, on a formulation of standardised mortar.

The hydraulic compositions according to the invention (Compositions 5 and 6) had the composition as described in Table 3 below, given that each composition further comprised:

450 g±2 g of binding phase (clinker+limestone);

1350 g±5 g of standardised sand (siliceous sand according to the EN 196-1 Standard of April 2006; supplier: Société Nouvelle du Littoral);

225 g±1 g of water; and

3% by mass of $SO_3$ relative to the binding phase.

The clinker had a Blaine specific surface area of 4500 cm²/g.

The unit in Table 3 unless otherwise specified is kg/m³.

TABLE 3

Compositions of the mortars tested for Example 2

| | Clinker | Limestone | $SO_3$/Clinker (mass %) | $Ca(NO_2)_2$/Clinker (mass %) |
|---|---|---|---|---|
| Comp. 5 | 315 | 135 | 4.2 | 5.6 |
| Comp. 6 | 247.5 | 202.5 | 5.5 | 7.1 |

The mortar was produced according to the procedure described below:
 Introduce the water, clinker, limestone, sulphate and nitrite into the vessel of a mixer;
 Mix at 140±5 rpm for 30 seconds;
 Regularly introduce the sand during 30 seconds;
 Mix at 285±10 rpm for 30 seconds;
 Interrupt the mixer for 90 seconds; and
 Mix at 285±10 rpm for 60 seconds.

The compressive strength was measured according to the procedure described herein above.

Table 4 herein below presents the obtained results.

TABLE 4

Results of the standardisation test

| | Compressive strength (MPa) | | | Classification according to the EN 197-1 |
|---|---|---|---|---|
| | 2 days | 7 days | 28 days | Standard |
| Comp. 5 | 26.0 | 40.1 | 53.0 | 42.5 R |
| Comp. 6 | 18.9 | 35.2 | 45.3 | 32.5 R |

According to Table 4 herein above, the hydraulic compositions according to the invention respected the compressive strength specifications of the EN 197-1 Standard of February 2001 (see paragraph 7, table 2 of the Standard).

The invention claimed is:
1. A hydraulic composition comprising
a hydraulic binder comprising a Portland cement clinker having a Blaine specific surface area of 4000 to 5500 cm²/g, from 2.5 to 8% of sulphate expressed by mass of $SO_3$ relative to the mass of clinker, from 1.5 to 10% of calcium nitrite and/or calcium nitrate expressed as anhydrous mass relative to the mass of clinker and from 15 to 50% of a mineral addition comprising calcium carbonate by mass relative to the total mass of binder, and
water,
wherein the quantity of clinker is from 220 to 450 kg/m³.

2. The composition according to claim 1, wherein the quantity of hydraulic binder is greater than or equal to 300 kg/m³.

3. A process for production of a hydraulic composition according to claim 1, comprising mixing the binder with water, wherein the temperature at the time of mixing of the various components with water and the temperature at the time of the setting of the composition is from 5 to 35° C.

4. A shaped article for the construction field comprising the hydraulic composition according to claim 1.

5. The hydraulic composition according to claim 1, wherein the hydraulic binder comprises from 2 to 7% of calcium nitrite and/or calcium nitrate expressed as anhydrous mass relative to the mass of clinker.

6. The hydraulic composition according to claim 1, wherein the hydraulic binder only comprises calcium nitrite.

7. The hydraulic composition according to claim 1, wherein the hydraulic binder comprises from 25 to 45% of the mineral addition comprising calcium carbonate by mass relative to the total mass of binder.

8. The hydraulic composition according to claim 1, wherein, in the hydraulic binder, the quantity of clinker is from 40 to 80% by mass relative to the total mass of binder.

9. The hydraulic composition according to claim 1, wherein the hydraulic binder further comprises a mineral addition other than a mineral addition comprising calcium carbonate.

10. The hydraulic composition according to claim 9, wherein the mineral addition other than a mineral addition comprising calcium carbonate is selected from the group consisting of pozzolan, fly ash, and any mixture thereof.

11. The hydraulic composition according to claim 1, wherein, in the hydraulic binder, the quantity of sulphate is at most 4%, expressed by mass of $SO_3$ relative to the hydraulic binder, the hydraulic binder comprising the clinker, the mineral addition comprising calcium carbonate, the sulphate and optionally a mineral addition other than a mineral addition comprising calcium carbonate.

12. A concrete or mortar having mechanical strength greater than 3 MPa at 6 hours, obtained by hardening the hydraulic composition according to claim 1.

* * * * *